United States Patent

Ryser

[11] 3,899,785
[45] Aug. 12, 1975

[54] APPARATUS FOR CONTROLLING AND MONITORING THE OPERATION OF A LOAD DEVICE

[75] Inventor: Kurt Ryser, Langenthal, Switzerland

[73] Assignee: Greiner Electronic AG, Langenthal, Switzerland

[22] Filed: Dec. 28, 1973

[21] Appl. No.: 429,160

[30] Foreign Application Priority Data
Jan. 19, 1973 Switzerland.......................... 753/73

[52] U.S. Cl............................ 340/309.1; 340/309.4
[51] Int. Cl............................................ G08b 23/00
[58] Field of Search .......... 340/309.1, 221; 307/141

[56] References Cited
UNITED STATES PATENTS
3,321,704   5/1967   Mann......................... 340/309.1 X
3,550,104   12/1970  Hashii........................ 340/309.1 X Primary Examiner—Harold I. Pitts
Attorney, Agent, or Firm—Lawrence E. Laubscher

[57] ABSTRACT

Apparatus is disclosed for controlling and monitoring the operation of load means that cyclically operate a load device, such as the dosage supply means of a clinical analyzing system. The load means includes a load motor the operation of which is initiated by an actuating switch that is operated by synchronously-driven program means to initially energize the load motor, whereupon a self-latching holding switch is operated from a first condition to a second condition to maintain the load motor energized throughout the remainder of the operating cycle of the load device. Monitor switch means are driven by the program means to periodically ascertain whether or not the holding switch — and, consequently, the load device — is in the desired condition at the predetermined time. Display means of the signal lamp type are operated by the monitor switch means to afford a visible indication of the occurrence of faulty operation of the load device, and scale and pointer means are driven by the program means to indicate the time of occurrence of the fault relative to the operating cycle of the load device.

9 Claims, 2 Drawing Figures

APPARATUS FOR CONTROLLING AND MONITORING THE OPERATION OF A LOAD DEVICE

It is known with respect to automatically operating, synchronously controlled instruments, especially automatic clinical analyzers, that the operational cycles of various load devices may be initiated by means of control pulses from a commmand-signal generator. In such a procedure, it is of utmost importance to know whether, following the generation of the control pulse, the unit being controlled does indeed perform the desired operational cycle and properly terminate it. In blood tests, for instance, errors in the analytical results may be of ponderous consequences for thhe patient involved, and consequently if the operational cycle were to be improper, immediate personnel notification or even shutting off of instrument would be required to avoid such errors themselves or at least to avoid their display. The present invention was developed to provide an apparatus for performing such monitoring operations.

Accordingly, a primary object of the present invention is to provide means for controlling and monitoring the operation of a cyclically-operable load device, characterized by the provision of program-controlled actuating switch means for initially energizing the load driving motor, holding switch means operable from a first condition to a second condition in synchronism with the load cycle to maintain the load motor energized until the end of the load operating cycle, and program-operated monitor switch means for periodically monitoring the holding switch means to determine whether or not the holding switch means — and, consequently, the load device — is in the desired condition at that given instant. The monitor switch means includes a start monitor switch which activates a display device in the event that the holding switch has not been switched to its second condition after a given period of time following operation of the actuating switch means (thereby indicating a faulty starting procedure of the load means), and an intermediate monitor switch is provided for operating the display device in the event that the holding switch is in the second condition at a time when it should be in the first condition (thereby indicating a faulty operation during an intermediate time in the operating cycle of the load means).

According to a more specific object of the invention, the monitor switch means are operable — upon the detection of faulty operation of the holding switch means (and, consequently, faulty operation of the load operating cycle) — to activate relay means to activate the display indicator means and simultaneously to disengage the program and load driving motors from their common power source. Preferably a pair of voltage sources having a common ground terminal are provided, one voltage source being an alternating current source for supplying power to the synchronous program and load motors, and the other voltage source being a direct-current source for supplying power to the monitor-switch-operated disconnect means. The holding switch means is of the reversible type including a movable contact connected with the common ground terminal, and a pair of stationary terminals a first one of which is connected with the direct-current voltage source, and a second one of which is connected with the alternating-current side of the system to connect the holding switch means in parallel with the actuating switch means. Preferably the holding switch is operated by a cam that is driven in synchronism with the load device.

BREIF DESCRIPTION OF THE DRAWINGS

Other objects and advantages of the invention will become apparent from a study of the following specification when viewed in the light of the accompanying drawing, in which:

FIG. 1 is a diagrammatic electrical schematic view of the control and monitoring system of the present invention; and FIG. 2 is a time chart illustrating switch operation versus time.

DESCRIPTION OF THE PREFERRED EMBODIMENT

Figure 1:
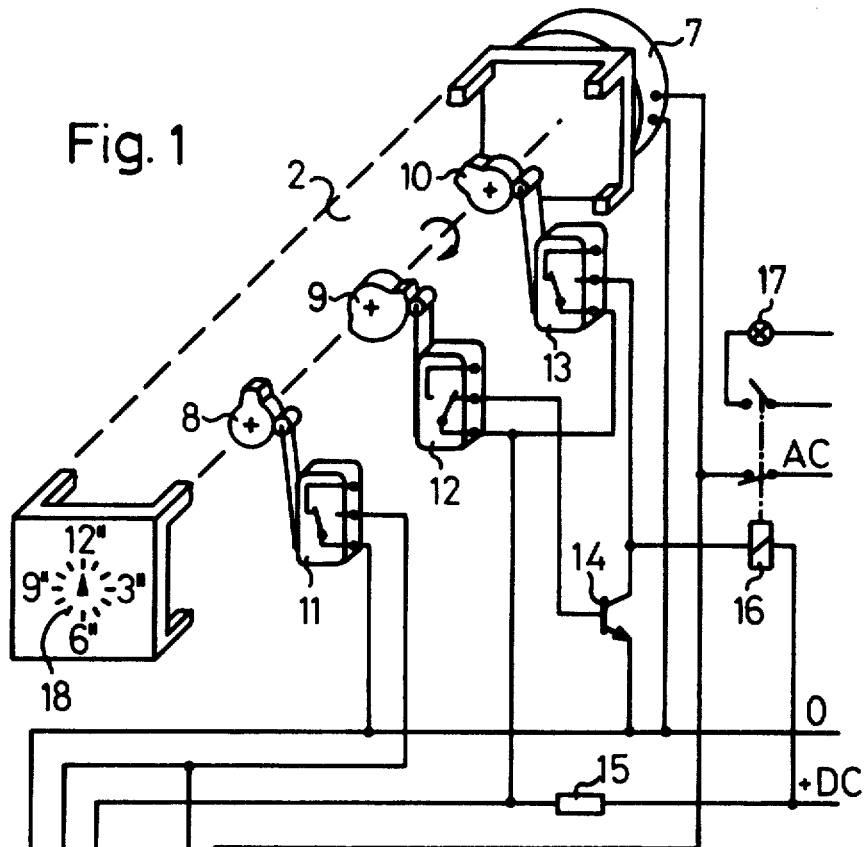

Referring now to the drawings, the load means 1, which is controlled and monitored by the program control means 2, includes a synchronous load motor 3 which rotatably drives an eccentric 4 and a cam 5. The eccentric 4 operates the reciprocatory member P of a load device, such as a dosage pump, not shown. The system includes alternating-current and direct-current voltage sources having a common ground terminal O. One terminal of motor 3 is connected with the terminal AC of an alternating current source via the normally closed contact of relay 16, and the other terminal of the load motor is connected with the common ground terminal via actuating switch 11. Connected across the actuating switch 11 is a reversible holding switch 6 having a movable contact connected with the common ground terminal O, a first stationary contact connected via biasing resistor 15 with the terminal +DC of the direct-current voltage source, and a second stationary contact connected with the stationary contact of actuating switch 11.

The program control and monitoring means 2 includes a synchronous program motor 7 the terminals of which are connected across the terminals O and AC of the alternating current voltage source via the normally-closed contacts of relay 16. The program motor 7 rotatably drives the cams 8, 9 and 10 for operating in a programmed manner the actuating switch 11 and intermediate and start monitoring switches 12 and 13, respectively, together with the continuously-driven pointer associated with a stationary scale 18. In the illustrated embodiment, the program motor 7 is connected with the pointer via the cam drive shaft to produce one program cycle per every twelve seconds. The movable contacts of the monitoring switches 12, 13 are connected with the terminal +DC of the direct-current voltage source via resistor 15, and the stationary contacts of the monitoring switches are connected with the base and collector electrodes, respectively, of a switching transistor the emitter electrode of which is connected with the common ground terminal O. The collector electrode of transistor 14 is further connected with the terminal +DC of the direct-current voltage source via the coil of relay 16 which, in the normally de-energized condition, has first normally-closed relay contacts connecting the program and load motors with the terminal AC of the a-c voltage source, and normally-open relay contacts for energizing the indicator lamp 17.

Figure 2:
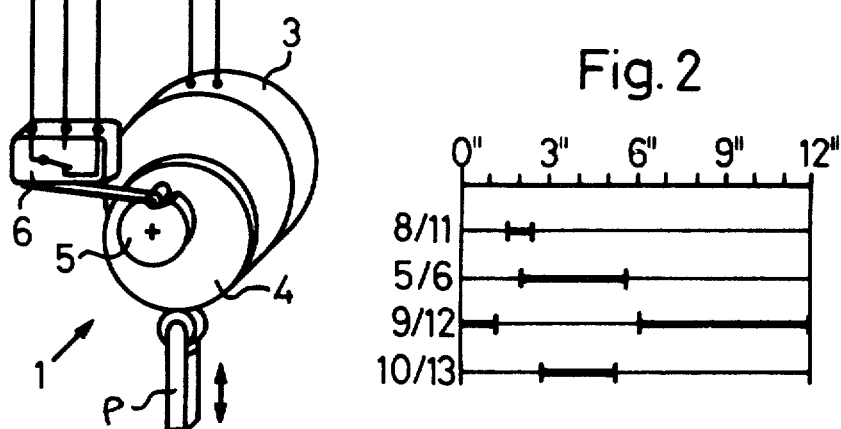

Referring now to the timing chart of FIG. 2, in operation, assume that all the components are in their initial illustrated conditions, whereupon intermediate monitor switch 12 is initially in a closed condition. Since switch 6 is still in the illustrated first position, a short circuit is established across monitoring switch 12, and consequently the initially closed condition of this monitoring switch has no effect on the circuit. Upon rotation of the program cam shaft by program motor 7, actuating switch 11 is closed by cam 8, whereupon load motor 3 is momentarily connected with the a-c voltage source and is driven to displace holding switch 6 from the illustrated first condition to its self-latching second condition, thereby short-circuiting the actuating switch 11 to maintain the load motor in the energized condition. Further rotation of motor 3 causes the cyclical reciprocatory operation of the pump actuator P by the eccentric 4.

Continued rotation of the program control shaft causes closing of the start monitoring switch 13, but since holding switch 6 is in the second condition, the connection of relay 16 to ground via switches 13 and 6 is broken, thereby maintaining the relay 16 in its normally de-energized condition. Upon further rotation of the program control shaft, start monitor switch 13 is opened, and load motor 3 continues to be energized until cam 5 causes switch 6 to be returned to its initial first condition, whereupon load motor 3 is disconnected from the a-c voltage source. The program shaft continues to be driven to close intermediate monitor switch 12, and since the base electrode of transistor 14 is connected with ground via switches 12 and 6, relay 16 remains de-energized and the pointer is driven to its starting point on scale 18, whereupon the twelve second program described above is repeated.

In accordance with the present invention, the monitoring switches positively produce an indication of the operating condition of the load means 1. In the event of starting interference, load motor 3 will not run and holding switch 6 will remain in its first position, whereupon when start monitor switch 13 is closed by the program cam shaft, a path from relay to ground is established via switches 13 and 6, whereupon the relay is activated to disconnect the system from the a-c source and to energize the indicator means 17. Program control means 2 is stopped, whereby the elapsed portion of the 12-second cycle (about 3 seconds) is read off scale 18 to indicate that the load means 1 is still in its initial position.

In the event that the load means 1 experiences interference during operation (i.e., at a time when holding switch 6 is in its second condition), upon closure of intermediate monitor switch 12, a bias voltage determined by the value of resistor 15 is applied to the base of transistor 14 to render conductive the power electrode circuit of the transistor, thereby energizing relay 16 to activate the signal lamp 17 and to de-energize the load motor 3 and the program motor 7. Owing to the display of about 6.5 seconds on the scale 18 of the de-energized program means, interruption of the load means in an intermediate position may be inferred.

As a rule, a single program control device will control and monitor several load devices and in such instances there will be correspondingly more numerous programming cams 8, 9, 10. Beginning and end of the ordinarily different operational cycles may be marked on the scale, so that interferences may be simply and quickly localized.

Sub-synchronizing generators in the form of program control devices with self-latching contacts of their own may also be provided in lieu of individual operational units, said generators in turn controlling and monitoring sub-operational units of the kind described. With respect to the main synchronizing generator, the sub-generators will be of a lesser cycle, for instance 6 seconds.

It will also be to advantage that the power supplies for control pulses 8/11 and holding current 5/6 on one hand and for monitoring, 9/12 and 10/13, on the other, are provided with a common terminal O which, as shown by FIG. 1, is connected with the movable contact of the self-latching holding switch 6. In addition to the two conductors required for the power supply and monitoring, only one more conductor will be needed going to the site of each operational unit for the purpose of monitoring, said additional conductor being connected with the ordinarily unused first contact of the reversible holding switch 6. In spite of this coupling between the DC circuit (+DC,O) With the AC circuit (AC,O), the characteristic advantages of both are made use of, for instance the good timing accuracy of the control programs, the cyclic periods and synchronization when using self-starting gear synchronous motors.

In the inherent AC to O-circuit of motors 3, 7, and except for such switching components as microswitches 6, 11 or relay 16 required for controlling and switching said circuit, there must be no further switching elements, contacts or parallel connections which might adversely affect reliability of the operational units and of the program generator on account of their susceptibility to interferences.

Aside from the inherently required adjustment of selfholding reversible switch 6 — which preferably should be performed prior to assembly — no further setting will be required in the load means 1; this is of special significance when the motor 3 must be mounted on functional grounds in a poorly accessible location of the automatic analyzer, or of any other synchronously controlled or keyed apparatus. The setting feature and the setting operation for monitoring the load means 1 is merely restricted to the easily accessible, built-in program control device 2.

While in accordance with the provisions of the Patent Statutes the preferred form and embodiment of the invention have been disclosed, it will be apparent to those skilled in the art that various changes and modifications may be made without deviating from the inventive concepts.

What is claimed is:

1. Apparatus for controlling and monitoring the operation of periodically operable load means (P), such as the dosage means of an automatic clinical analyzer, comprising
   a. at least a first voltage source (AC);
   b. normally de-energized load motor means (3) for driving said load means periodically between first and second positions;
   c. means including an actuating switch (11) for initially connecting said load motor means with said first voltage source for a relatively brief initial period to initiate the operating cycle of said load means;
   d. means including a holding switch (6) for subsequently connecting said load motor means with said first voltage source for a subsequent period of time, said holding switch means having a first condition when said load means is in the first position, and a second condition when said load means is displaced from said first position;

e. display means (17) having an initial state of energization; and f. means including disconnect means (16) and monitor switch means (12, 13) responsive to the instantaneous condition of said holding switch for disconnecting said load motor means from said first voltage source and for operating said display means to the other state of energization in the event that said holding switch is not in its anticipated condition during any given period of the operating cycle of said load means.

2. Apparatus as defined in claim 1 wherein said monitor switch means comprises a start monitor switch (13) operable during an intermediate portion of the operating cycle of said load means for disconnecting said load motor means from said first source and for changing the state of energization of said display means in the event said holding switch means has remained in its first condition.

3. Apparatus as defined in claim 2 wherein said monitor switch means comprises an intermediate monitor switch (12) operable during the initial and final stages of the operating cycle of said load means for disconnecting said load motor means from said first source and for changing the state of energization of said display means in the event said holding switch means has remained in its second condition.

4. Apparatus for controlling and monitoring the operation of periodically operable load means (P), such as the dosage means of an automatic clinical analyzer, comprising a. first (AC) and second (DC) voltage sources having a common terminal (O);

b. normally de-energized load motor means (3) for driving said load means periodically between first and second positions, said load motor means having a pair of terminals;

c. means including an actuating switch (11) for initially connecting said load motor means with said first voltage source for a relatively brief initial period to initiate the operating cycle of said load means, one terminal of said load motor means being connected with said common source terminal via said actuating switch and the other terminal of said load motor means being connected with the other terminal of said first voltage source;

d. means including a holding switch (6) for subsequently connecting said load motor means with said first voltage source for the remaining period of the operating cycle of said load means, said holding switch including a movable contact and first and second stationary contacts, said holding switch movable contact being connected with the contact of said actuating switch which is connected with said source common terminal, said holding switch first stationary contact being connected with the other terminal of said second voltage source, said holding switch second stationary contact being connected with the contact of said actuating switch which is connected with said one terminal of said load motor means, thereby to connect said holding switch movable and second stationary contacts in parallel with said actuating switch, said holding switch movable contact being in engagement with said first and second stationary contacts when said load means is in the first position and in a second position displaced from said first position, respectively;

e. display means (17) having an initial state of energization; and f. means including disconnect means (16) and monitor switch means (12, 13) responsive to the instantaneous condition of said holding switch for disconnecting said load motor means from said first voltage source and for operating said display means to the other state of energization in the event that said holding switch is not in its anticipated condition during any given period of the operating cycle of said load means, said disconnect and monitor switch means being connected with said second voltage source.

5. Apparatus as defined in claim 4, wherein said load motor means includes a load motor (3), and cam means (5) driven by said load motor for periodically operating said holding switch between said first and second conditions.

6. Apparatus as defined in claim 4, and further including normally-energized program motor means (7) connected with said first voltage source, and cam means driven by said program motor means for periodically operating said actuating and monitor switch means, said disconnect means being operable to de-energize said program motor means simultaneously with the de-energization of said load motor.

7. Apparatus as defined in claim 6 wherein said disconnect means further includes 1. a disconnect switch having normally closed contacts connected in series with said load motor means;

2. relay means including a relay coil (16) for opening said disconnect switch contacts and for changing the state of energization of said display means; and 3. control device (14) having a pair of power circuit electrodes connected in series with said relay coil to define a series branch connected across said second voltage source, said start monitor switch (13) being connected in series with the movable and first stationary contacts of said holding switch to define a series branch connected in parallel across the power electrode circuit of said control device, whereby when the contacts of said start monitor switch and the movable and first stationary contacts of said holding switch means are closed, said relay means is operable to de-energize said load and program motors and to change the state of energization of said indicator means.

8. Apparatus as defined in claim 7, wherein said control device also includes a control electrode, said intermediate monitor switch (12) being connected between said control electrode and the other terminal of said second voltage source, whereby when said holding switch is in the second condition and said intermediate monitor switch is closed, said control device becomes conductive to operate said relay means to de-energize said load and program motors and to change the state of energization of said indicator means.

9. Apparatus as defined in claim 6, and further including a stationary scale, and a pointer driven by said program motor to afford a visual indication of the elapsed program time prior to the de-energization of said program motor means, the cycle of said program motor means being greater than that of said load motor means.

* * * * *